(12) United States Patent
Mercier et al.

(10) Patent No.: US 8,977,002 B2
(45) Date of Patent: *Mar. 10, 2015

(54) METHOD OF POINT SOURCE TARGET DETECTION FOR MULTISPECTRAL IMAGING

(75) Inventors: Michael Mercier, Nashua, NH (US);
Joseph M. Schlupf, Newburyport, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/542,681

(22) Filed: Jul. 6, 2012

(65) Prior Publication Data

US 2014/0010406 A1    Jan. 9, 2014

Related U.S. Application Data

(60) Provisional application No. 61/506,195, filed on Jul. 11, 2011.

(51) Int. Cl.
*G06K 9/00* (2006.01)
*G06K 9/40* (2006.01)

(52) U.S. Cl.
CPC .............. *G06K 9/00624* (2013.01); *G06K 9/40* (2013.01); *G06K 2009/00644* (2013.01)

USPC ......................................................... 382/103

(58) Field of Classification Search
None
See application file for complete search history.

(56) References Cited

U.S. PATENT DOCUMENTS

| 7,613,360 B2* | 11/2009 | Ma et al. ....................... 382/284 |
| 2009/0268966 A1* | 10/2009 | Grady et al. .................. 382/191 |
| 2012/0007979 A1* | 1/2012 | Schneider et al. ............ 348/116 |
| 2012/0015825 A1* | 1/2012 | Zhong et al. ..................... 506/6 |
| 2012/0182438 A1* | 7/2012 | Berkner et al. ............ 348/222.1 |
| 2013/0016909 A1* | 1/2013 | Mercier et al. ................ 382/191 |
| 2013/0110311 A1* | 5/2013 | Ver Steeg et al. ................ 701/1 |
| 2014/0010406 A1* | 1/2014 | Mercier et al. ................ 382/103 |

* cited by examiner

*Primary Examiner* — Tahmina Ansari
(74) *Attorney, Agent, or Firm* — Global IP Services, PLLC; Prakash Nama; Daniel J. Long

(57) ABSTRACT

A method of point source target detection for multispectral imaging is disclosed. In one embodiment, a background source spectral ratio is determined using at least one radiant source, such as baseline intensities, camera optics sensitivity properties and atmospheric transmission properties. Further, a spectral difference is computed for each pixel in an incoming frame by applying the background source spectral ratio to a spectral band-specific radiant intensity value of each pixel. Furthermore, offset biasing in the incoming frame is removed by applying spatial median filtering to each computed spectral difference in the incoming frame.

9 Claims, 2 Drawing Sheets

METHOD OF POINT SOURCE TARGET DETECTION FOR MULTISPECTRAL IMAGING

CROSS-REFERENCE TO RELATED APPLICATION

This Application claims rights under 35 USC §119(e) from U.S. Application 61/506,195 filed Jul. 11, 2011, the contents of which are incorporated herein by reference.

BACKGROUND OF THE INVENTION

1. Field of the Invention

The present invention relates to optical sensors, more specifically to multispectral target detection using optical sensors.

2. Brief Description of Related Art

One of the most common uses of optical sensors in a military setting is to detect and counter launched ordnance as part of a threat detection system. To achieve maximum protection of a host platform, it is crucial to rapidly detect a threat and accurately identify a type of the threat detected while minimizing use of processing resources. One way to achieve this end is by recognizing a spectral signature of a point source in an optical field of view (FOV).

Each type of launched ordnance typically emits a signature consistent radiant intensity in each spectral band and of consistent spectral ratio. Typically, detecting such signatures becomes more complex because the optical sensors often record many non-target, background sources of radiation, which can obscure a true threat signature. Thus, in order to properly identify a detected threat, these background sources of radiation must be understood, analyzed and accounted for.

Existing method for determining a spectral ratio of the image background is to find the average spectral ratio of a group of pixels surrounding an area of interest on a data capture (frame). However, this method is vulnerable to corruption if even just one or two pixels have aberrant radiant properties. The vulnerability in the existing method stems from the inability to account for the true background sources. Rather, the ratio and average intensity can be easily influenced by other phenomenon, because they are merely based on an average of arbitrary group of pixels.

Further, sensor conditions also create a spectral bias offset. Under the existing method, an attempt is made to eliminate this spectral bias offset by applying a median filter to the intensity value for each spectrum before applying an average-based spectral background ratio and subtracting intensity values from each spectrum. Unfortunately, this method requires substantial processing power to apply the filter to each spectrum and this separated filtering may introduce noise into the image because the background source has not yet been removed.

SUMMARY OF THE INVENTION

A method of point source target detection for multispectral imaging is disclosed. According to one aspect of the present subject matter, a background source spectral ratio is determined using at least one radiant source, such as baseline intensities, camera optics sensitivity properties and atmospheric transmission properties. Further, a spectral difference is computed for each pixel in an incoming frame by applying the background source spectral ratio to a spectral band-specific radiant intensity value of each pixel. Furthermore, offset biasing in the incoming frame is removed by applying spatial median filtering to each computed spectral difference in the incoming frame.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

Figure 1:
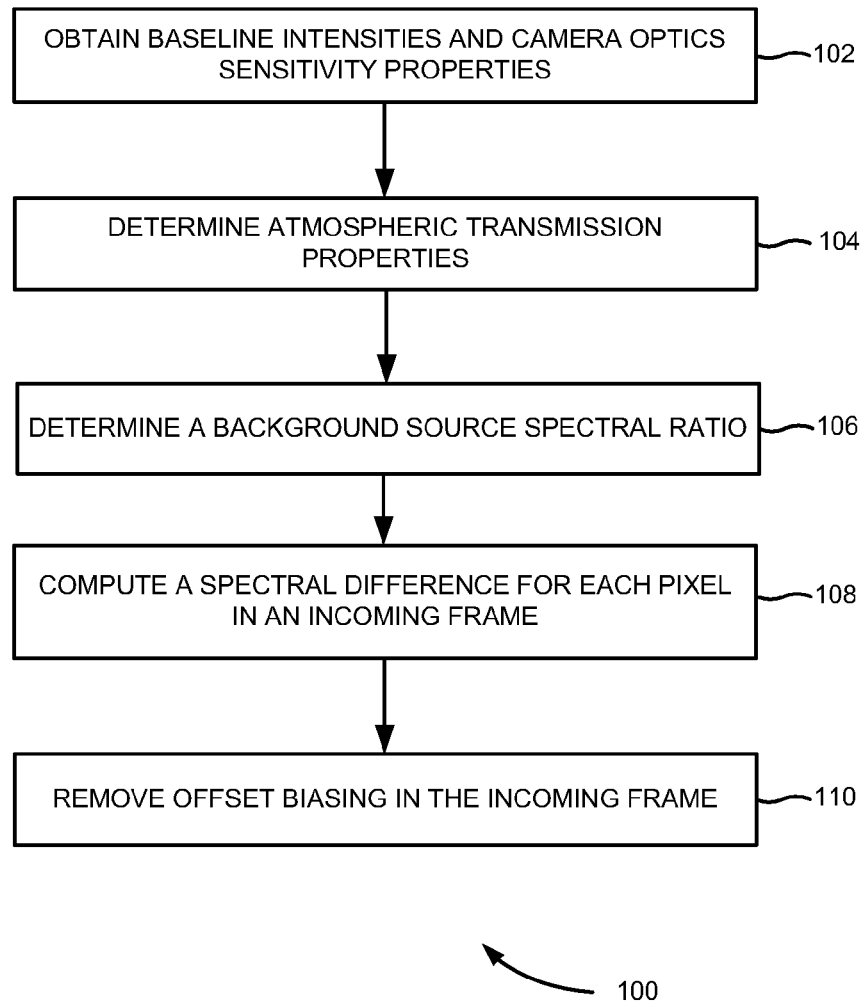
FIG. 1 illustrates a flowchart of a method of point source target detection for multispectral imaging, according to an embodiment of the present subject matter.

FIG. 1 illustrates a flowchart 100 of a method of point source target detection for multispectral imaging, according to an embodiment of the present subject matter. At block 102, baseline intensities and camera optics sensitivity properties of an optical sensor in spectral bands are obtained. For example, the baseline intensities are blackbody temperature of the earth and any other background temperature of a spectral image being viewed. At block 104, the atmospheric transmission properties of the spectral bands are determined as a function of a range to the pixel and atmospheric visibility conditions. At block 106, a background source spectral ratio is determined using at least one radiant source, such as the baseline intensities, camera optics sensitivity properties and atmospheric transmission properties.

At block 108, a spectral difference for each pixel in an incoming frame is computed by applying the determined background source spectral ratio to a spectral band-specific radiant intensity value of each pixel. This is explained in more detail with reference to FIG. 2. For example, the spectral difference for each pixel in the incoming frame is computed using the equation:

spectral difference=primary image radiant intensity value−background source spectral ratio*reference image radiant intensity value.

At block 110, offset biasing in the incoming frame is removed by applying spatial median filtering to each computed spectral difference in the incoming frame. In one embodiment, a median filter that is based on computing a median value of a 3×3 pixel area around a target pixel and subtracting the computed median value from a target pixel value to remove spectral bias and also to act as a point source filter, which reduces intensity of large spectral objects that do not exhibit point source qualities, is applied.

Figure 2:
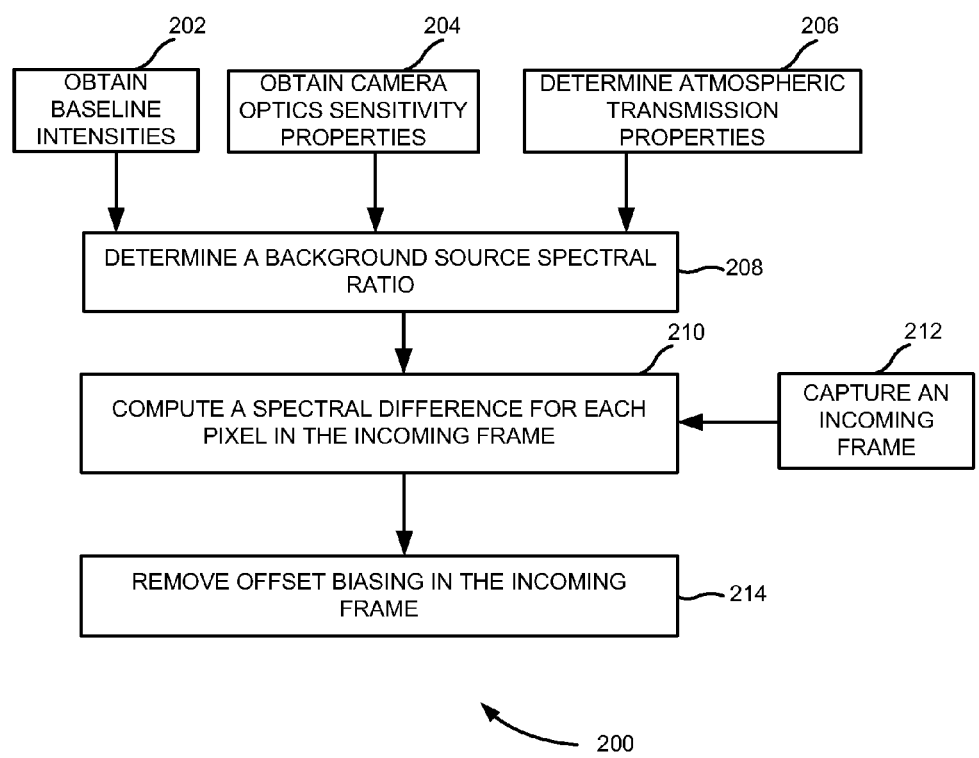
FIG. 2 is another flowchart of the method of the point source target detection for the multispectral imaging, according to an embodiment of the present subject matter.

Referring now to FIG. 2, which is another flowchart 200 that illustrates a method of point source target detection for multispectral imaging, according to an embodiment of the present subject matter. At block 202, baseline intensities of an optical sensor in spectral bands are obtained. At block 204, camera optics sensitivity properties of the optical sensor are obtained. For example, the baseline intensities and camera optics sensitivity properties of the optical sensor are generally known by a user or system. At block 206, atmospheric transmission properties of the spectral bands are determined as a function of a range to the pixel and atmospheric visibility conditions. In one embodiment, a threat detection system of which the optical sensor is a part is used to determine the atmospheric transmission properties. At block 208, a background source spectral ratio is determined using at least one radiant source, such as the baseline intensities, camera optics sensitivity properties and atmospheric transmission properties.

At block 210, a spectral difference for each pixel in an incoming frame, captured at block 212, is computed by applying the background source spectral ratio to a spectral band-specific radiant intensity value of each pixel. In one embodiment, the background sources of the spectral image are removed by subtracting the spectral band-specific radiant intensity value of each pixel from intensity values in other spectral bands. To eliminate non-spectral background sources, the spectral difference is computed by applying the background source spectral ratio to a primary image radiant intensity value and reference image radiant intensity value. As a result, the background sources are eliminated revealing true point-source threats. For example, the spectral difference for each pixel in the incoming frame is computed using the equation:

spectral difference=primary image radiant intensity value−background source spectral ratio*reference image radiant intensity value.

At block 214, offset biasing in the incoming frame is removed by applying spatial median filtering to each computed spectral difference in the incoming frame. In one embodiment, a median filter that is based on computing a median value of a 3×3 pixel area around a target pixel and subtracting the computed median value from a target pixel value to remove spectral bias and also to act as a point source filter, which reduces intensity of large spectral objects that do not exhibit point source qualities, is applied. In one exemplary implementation, a post-differencing spatial median filter eliminates the offset bias without introducing unnecessary noise while consuming minimal processing resources.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method of point source target detection for multispectral imaging, comprising:
   determining a background source spectral ratio using at least one radiant source from the group consisting of baseline intensities, camera optics sensitivity properties and atmospheric transmission properties;
   computing a spectral difference for each pixel in an incoming frame by applying the determined background source spectral ratio to a spectral band-specific radiant intensity value of each pixel; and
   removing spectral bias offset in the incoming frame by applying spatial median filtering to each computed spectral difference in the incoming frame, comprising:
      applying a median filter that is based on computing a median value of a 3×3 pixel area around a target pixel and subtracting the computed median value from a target pixel value to remove the spectral bias offset and also to act as a point source filter.

2. The method of claim 1, wherein determining the background source spectral ratio comprises:
   obtaining the baseline intensities and the camera optics sensitivity properties;
   determining the atmospheric transmission properties as a function of a range to the pixel and atmospheric visibility conditions; and
   determining the background source spectral ratio using the at least one radiant source from the group consisting of the baseline intensities, camera optics sensitivity properties and atmospheric transmission properties.

3. The method of claim 1, wherein the baseline intensities are blackbody temperature of the earth and any other background temperature of a spectral image being viewed.

4. The method of claim 1, wherein applying the median filter reduces intensity of large spectral objects that do not exhibit point source qualities.

5. The method of claim 1, wherein computing the spectral difference for each pixel in the incoming frame by applying the background source spectral ratio to the spectral band-specific radiant intensity value of each pixel comprises:
   computing the spectral difference for each pixel in the incoming frame using the equation:

spectral difference=primary image radiant intensity value−background source spectral ratio * reference image radiant intensity value.

6. A method of point source target detection for multispectral imaging, comprising:
   obtaining the baseline intensities and the camera optics sensitivity properties and wherein the baseline intensities are blackbody temperature of the earth and any other background temperature of a spectral image being viewed;
   determining the atmospheric transmission properties as a function of a range to the pixel and atmospheric visibility conditions;
   determining the background source spectral ratio using the at least one radiant source from the group consisting of the baseline intensities, camera optics sensitivity properties and atmospheric transmission properties;
   computing a spectral difference for each pixel in an incoming frame by applying the determined background source spectral ratio to a spectral hand-specific radiant intensity value of each pixel; and
   removing spectral bias offset in the a incoming frame by applying spatial median filtering to each computed spectral difference in the incoming frame, comprising:
      applying a median filter that is based on computing a median value of a 3×3 pixel area around a target pixel and subtracting the computed median value from a target pixel value to remove the spectral bias offset and also to act as a point source filter.

7. The method of claim 6, wherein applying the median filter reduces intensity of large spectral objects that do not exhibit point source qualities.

8. The method of claim 6, wherein computing the spectral difference for each pixel in the incoming frame by applying the background source spectral ratio to the spectral band-specific radiant intensity value of each pixel comprises:

computing the spectral difference for each pixel in the incoming frame using the equation:

spectral difference=primary image radiant intensity value−background source spectral ratio * reference image radiant value.

9. A method of point source target detection for multispectral imaging, comprising:

obtaining the baseline intensities and the camera optics sensitivity properties and wherein the baseline intensities are blackbody temperature of the earth and any other background temperature of a spectral image being viewed;

determining the atmospheric transmission properties as a function of a range to the pixel and atmospheric visibility conditions;

determining the background source spectral ratio using the at least one radiant source from the group consisting of the baseline intensities, camera optics sensitivity properties and atmospheric transmission properties;

computing the spectral difference for each pixel in the incoming frame using the equation:

spectral difference=primary image radiant intensity value−background source spectral ratio * reference image radiant intensity value; and removing spectral bias offset in the incoming frame by applying spatial median filtering to each computed spectral difference in the incoming frame, and wherein applying the median filter is based on computing a median value of a 3×3 pixel area around a target pixel and subtracting the computed median value from a target pixel value to remove spectral bias offset and also to act as a point source filter, which reduces intensity of large spectral objects that do not exhibit point source qualities.

* * * * *